June 20, 1967 R. O. WHITAKER 3,326,055
AUTOMATICALLY SHIFTING TWO SPEED ROTATIONAL DRIVE SYSTEM
Filed March 18, 1965 2 Sheets-Sheet 1

June 20, 1967  R. O. WHITAKER  3,326,055
AUTOMATICALLY SHIFTING TWO SPEED ROTATIONAL DRIVE SYSTEM
Filed March 18, 1965  2 Sheets-Sheet 2
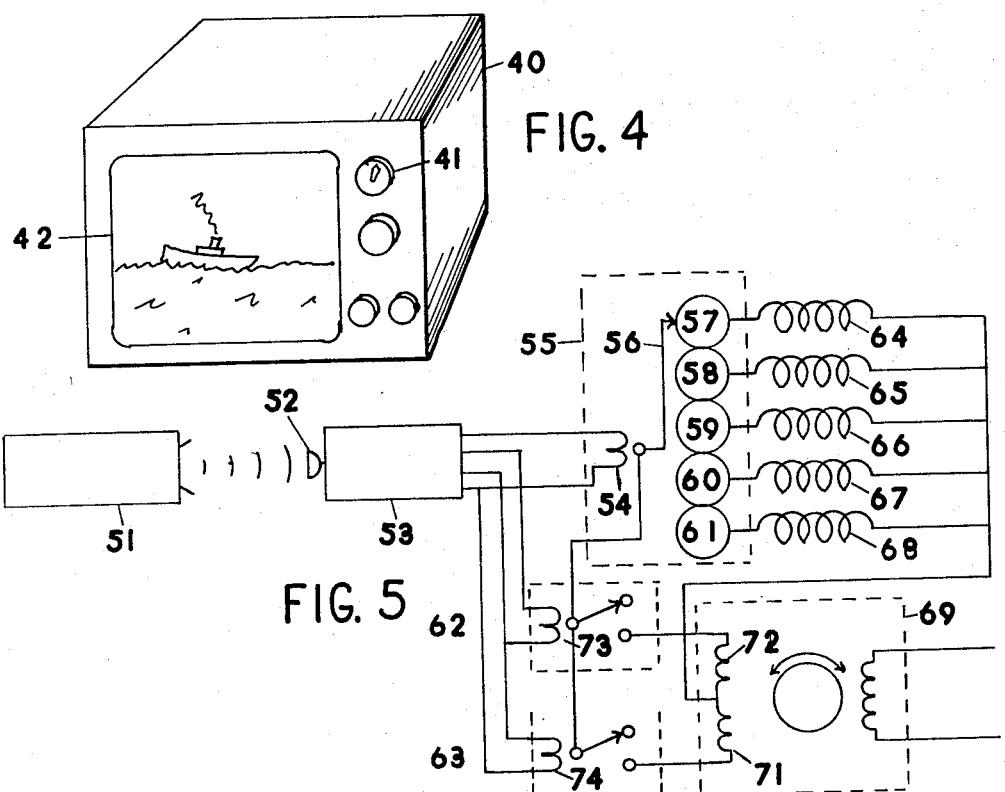

United States Patent Office 3,326,055
Patented June 20, 1967

3,326,055
AUTOMATICALLY SHIFTING TWO SPEED
ROTATIONAL DRIVE SYSTEM
Ranald Otis Whitaker, 402 E. 28th St.,
Indianapolis, Ind. 46205
Filed Mar. 18, 1965, Ser. No. 440,801
13 Claims. (Cl. 74—10.54)

This invention relates to drives for coupling a source of rotational power, such as a motor, to a load which is to be precisely positioned rotationally. More particularly in the embodiments here disclosed concepts of the present invention provide novel and advantageous means to provide a first or low speed for obtaining precise positioning within a given rotational region, and a second or fast speed for quickly moving from one rotational region to another.

A particular and desirable application for the subject invention is in the adjustment of the UHF tuner in a remote control system for a television receiver. For proper reception of stations transmitting color signals it is necessary that the UHF tuner be positioned with a fine accuracy such that the maximum error is less than five minutes of arc. The total range of adjustment is often 300 degrees. If a single speed drive is employed in which the gear ratio is sufficiently low that the tuner can be adjusted with the desired accuracy, the drive is so slow that an excessively long time is required to rotate the tuner from one region within its large range to another region. To overcome this shortcoming a two-speed drive system is considered essential.

Such two-speed systems are presently available for manual adjustment of UHF tuners. Generally incorporated into these systems is a frictional clutch which drives a cam to effect the low speed drive. A positive drive mechanism having a null zone effects the high speed drive. While the high speed drive is in its null zone, the tuner is driven by the friction clutch and cam. As soon as the limit of the high speed drive null zone is reached, the high speed drive takes over and the friction clutch begins slipping. The clutch continues to slip and the high speed drive continues to drive the tuner at high speed as long as the direction of drive remains the same. As soon as the direction of drive reverses, the high speed drive enters its null zone again and the low speed clutch stops slipping. Drive is at low speed until the null zone is again traversed. The high speed drive then takes over and drives the tuner again at high speed while the clutch slips.

A serious disadvantage of this type of two-speed drive relates to the torque required a particular disadvantage in remote control systems; for, with the two-speed drive just discussed, the motor of the remote control must supply sufficient torque to overcome both the friction of the tuner and the friction of the clutch during high speed drive. The shortcoming becomes even still more serious if the motor is coupled to the drive by a magnetic clutch. The clutch must develop sufficient torque to overcome both frictional loads. A larger and more expensive clutch is required. In manual control systems the operator can supply the extra torque at no extra cost. Only in the case of remote control does this conventional system prove particularly disadvantageous.

Accordingly, concepts of the present invention provide a two-speed drive system which requires from the source of rotational power sufficient torque to overcome only the resisting torques developed by the load itself.

More particularly, concepts of the present invention provide a drive system, which, upon reversal of direction of drive, will always move the load for a brief period at a low speed and will then shift automatically to a high speed drive, yet will permit the user to start and stop the movement of the load at will.

These and other concepts, details, and objects providing a desired two-speed drive having the advantages indicated will be understood by reference to the following detailed description of illustrative embodiments thereof, reference being had to the accompanying somewhat diagrammatic drawings, in which:

FIG. 4 is a perspective view, illustrating a television receiver which incorporates the present invention;

FIG. 5 is a schematic diagram of a television remote control system with which the present invention could be used;

Figure 1:
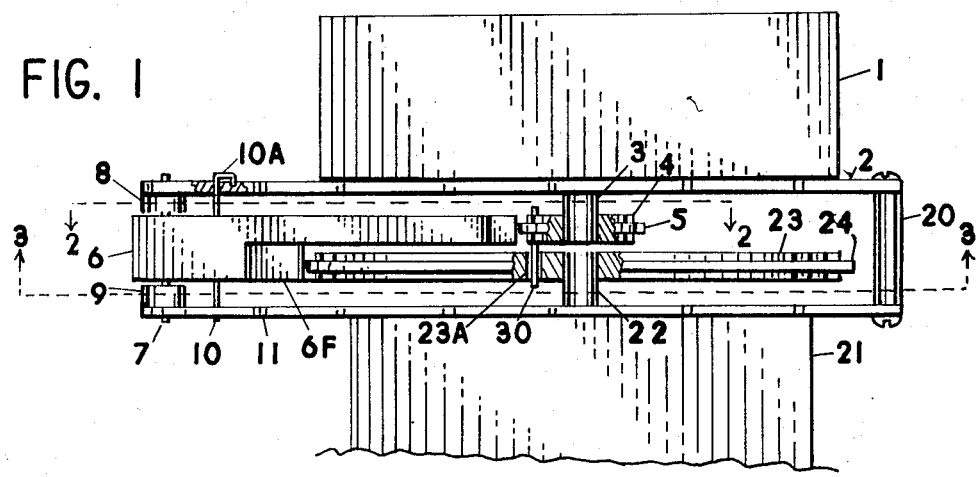
FIG. 1 is an elevation view of one embodiment of the present invention in which a motor is employed to drive a UHF tuner, partially in section.

As shown in the drawings, a drive motor 1 is supported on a frame member or motor base 2, as indicated in FIG. 1. Affixed to motor shaft 3 is a drive wheel 4 carrying friction means such as a rubber tire 5. A sector 6, described in more detail hereinafter, is carried on shaft 7, for pivotal movement. Spacer 8, slipped over shaft 7 and fitting loosely between sector 6 and motor base 2, and a spacer 9 similarly positioned between sector 6 and tuner base 11, serve to maintain sector 6 a fixed distance from motor base 2.

The low speed drive will be described first.

Figure 2:
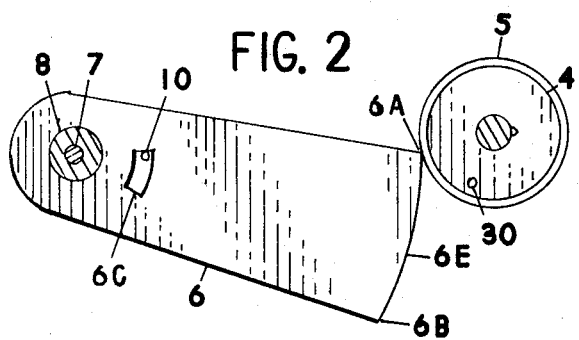
FIG. 2 is a sectional view of a portion of the embodiment of FIG. 1, taken generally along section line 2—2 of FIG. 1.

As indicated in FIG. 2, sector 6 is adapted to be engaged by rubber tire 5 of motor wheel 4. For the position of the parts shown in FIG. 2, rotation of motor wheel 4 in the counter-clockwise direction will result in slipping of sector 6 on tire 5 in the region marked 6A. With such movement of wheel 4, sector 6 is not caused to move.

If the direction of rotation of wheel 4 is reversed, so that it rotates in the clockwise direction, sector 6 is driven by its engagement with tire 5, and begins rotating in the counter-clockwise direction. This rotation continues until region 6B of sector 6 moves to the point of disenagement with tire 5. Sector 6 will then begin to slip on tire 5 and will no longer be rotated by tire 5.

If the direction of motor 1 is against reversed, so that it once again rotates in the counter-clockwise direction, sector 6 will again move into driving engagement with tire 5 and be rotated clockwise back to its initial position.

Bias means are provided, insuring that driving engagement of sector 6 and tire 5 will ensue whenever the direction of rotation of motor 1 is reversed. This bias is provided by spring 10, held at 10A by motor base 2, and extending into slot 6C of sector 6. Spring 10 is shown as fixed also at its lower end in a frame member such as the tuner base 11. The arrangement is such that spring 10 is flexed only at the extremities of the rotational span of sector 6, biasing sector 6 toward engagement with drive wheel 4 at both extreme positions of sector 6. Spring 10 may take alternate forms. For instance, it may be a coiled spring about either spacer 8 or spacer 9. In some cases it may be omitted and the structure altered so that gravity acts to keep sector 6 biased toward engagement with wheel 4.

The arrangement above described is such that upon each reversal of motor 1, sector 6 is driven through an arc of about 30 degrees. Sector 6 then slips upon tire 5, and for further rotation of wheel 4 in the same direction, no rotation of sector 6 takes place.

Tuner base 11 is shown as spaced from motor base 2 by shaft 7 and by a spacer 20. More spacers similar to spacer 20 may be positioned about the structure as needed. Tuner 21 is affixed to tuner base 11. Tuner shaft 22 carries fixed at its end a tuner wheel 23 carrying friction means such as a rubber tire 24.

Parts are proportioned such that, when sector 6 is in the position indicated in FIG. 2, driving face 6D of sector 6 (see FIG. 3) does not engage tire 24 of wheel 23. Only after sector 6 has been engaged by tire 5 of drive wheel 4 as described above and rotated a small amount, does face 6D of sector 6 come into engagement with tire 24. Upon engaging tire 24, further rotation of sector 6 causes rotation of wheel 23. This rotation continues until sector 6 approaches the other end of its travel. Driving face 6D then moves out of engagement with tire 24, and wheel 23 is no longer turned by sector 6.

It is noted that sector face 6D (which engages tire 24) is significantly shorter in peripheral extent than is the sector face 6E (which engages tire 5), although both faces 6D and 6E are in general radial alignment. Faces 6D and 6E are shown as parts of one integral unit (sector 6).

A similar action takes place upon reversal of the direction of rotation of sector 6.

The arrangement described above causes tuner shaft 22 to be rotated for a brief period following the reversal of motor 1. It is noted that for a system proportioned as indicated in the drawings, tuner shaft 22 will rotate through an angle about one fourth that through which sector 6 turns, and about one sixteenth that through which wheel 4 turns.

The system above described constitutes the low speed drive of the present invention. The high speed drive is next to be described.

Figure 3:
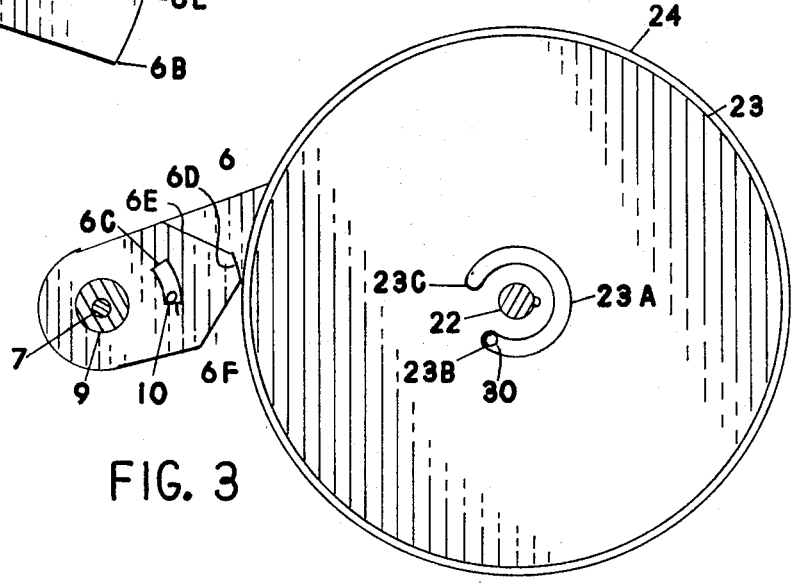
FIG. 3 is a sectional view of a second portion of the embodiment of FIG. 1, taken generally along section line 3—3 of FIG. 1.

As shown in FIGS. 1 and 3, it is effected by pin 30, one end of which moves in a lost motion or slip permitting receiver means such as a slot 23A of wheel 23, as indicated in FIG. 3, the pin being shown at the clockwise end 23B of slot 23A. The other end of pin 30 is fixed in wheel 4. Considering the position of the parts indicated in FIG. 3, a clockwise rotation of sector 6 (in response to drive from wheel 4) will be attended by rapid movement of pin 30 in a counter-clockwise direction; it being noted that the pin 30 is carried by wheel 4 and that pin 30 may move freely in slot 23A.

During this action, the low speed drive is causing wheel 23 to follow (in the same counter-clockwise direction that pin 30 is moving) at a much lower rate. After wheel 4 has rotated through approximately one revolution, the low speed drive will disengage as described in connection with the low speed drive.

The parts are proportioned so that when disengagement of the low speed drive occurs, pin 30 is very near to the counter-clockwise end 23C of slot 23. Consequently, after disengagement of the low speed drive, there is a very brief pause during which there is no drive, assuring against the possibility of simultaneous engagement of both drives; and then the high speed drive becomes operative, being effected by engagement of pin 30 with slot face 23C, following which motor shaft 3 and tuner shaft 22 turn together at the same speed.

Upon reversal of motor 1, the reverse action takes place. The low speed drive first drives tuner 21 slowly in the reverse direction. Upon its disengagement, the high speed drive moves into engagement and drives tuner 21 at a rapid rate.

In using the system in the actual tuning of a television receiver, the operator watches the UHF channel indicator 41 of the receiver 40 illustrated in FIGURE 4. He causes the remote control system to operate until the desired channel is approached and passed. He then reverses the remote control. This brings the low speed drive into action. The operator then watches the picture. When the desired quality is obtained, he deactivates the remote control. Due to motor inertia, the drive will coast a short distance past the point at which the control is deactivated. A second reversal of the motor may be necessary. If the control is operated in short bursts which do not give the motor sufficient time to get up to full speed, an accuracy of tuner adjustment exceeding that required can be achieved.

The system as described above discloses the present invention in its simplest form. However, it is noted that motor 1 is used to drive the UHF tuner only and cannot be used to drive other items to be driven, such as the VHF tuner, the volume control, and perhaps an indoor antenna. It is desirable from an economy point of view that only one motor be used to effect all adjustment of functions to be adjusted by the remote control. As indicated in my previous Patent 2,743,797, a single motor can be employed to drive several functions through use of magnetic clutches such as are there described. Accordingly a magnetic clutch will generally be interposed between motor 1 and wheel 4. This clutch is generally under control of the remote control system and is activated and deactivated instantaneously upon signal from the operator. As a consequence thereof, deactivation immediately uncouples the tuner from the motor, and coasting of the motor does not result in the further adjustment of tuner 21.

If desired, gear wheels can be used in place of the wheels and rubber tires, and gear sectors in place of the plain sectors described above.

A preferred remote control system in which the present invention could be employed is represented schematically in FIG. 5. Ultrasonic transmitter 51 is operated by the viewer and is capable of transmitting three separate signals. The first of these signals shall be referred to as the "function" signal. It could be a 38 kc. signal. The second shall be called the "up" signal. It could be a 40 kc. signal. The third shall be called the "down" signal. It could be a 42 kc. signal.

The signals from transmitter 51 are received by microphone 52 and fed to remote control receiver 53. Receiver 53 contains an amplifier and three resonant circuits, each of which responds to a separate one of the three control signals.

In response to the function signal, coil 54 of stepping relay 55 is activated. This causes relay arm 56 to move to the next relay contact. For the position of the parts shown in FIG. 5, this would be from contact 57 to contact 58. The relay is continuous, that is, when arm 56 is on contact 61, one more step will move it to contact 57. By activating the transmitter in quick succession, the viewer can move the stepping relay very quickly to any desired one of the several contacts.

In response to an up signal, relay 62 is activated.

In response to a down signal, relay 63 is activated.

Magnetic clutch coils 64–68 connect to contacts 57–61 respectively. Associated with each clutch is a particular function to be controlled. For instance, coil 64 could be associated with a clutch which connects motor 1 to UHF tuner 21. The other coils could be associated with clutches which are in turn associated with the VHF turner, the volume control, the color control, and an indoor antenna.

Motor 69 in the preferred system is a wound shaded pole motor having a primary winding energized from the AC line and shaded windings 71 and 72.

For the position of the parts indicated in FIGURE 5, generation of the up signal at the transmitter will cause relay 62 to close. This will permit current from shaded winding 72 to pass through coil 64. This in turn will activate the clutch associated with coil 64, and will cause motor 1 to turn in the direction which will move the function in the "up" direction.

If the down signal were transmitted, relay 63 would close. This would permit current from shaded winding 71 to pass through coil 64. This would activate the corresponding clutch and cause motor 1 to turn in the direction which would move the function in the "down" direction.

In an alternate embodiment, a capacitor-type AC motor is utilized. In such a system a double contact relay is generally required in both the up circuit and the down circuit.

From the above explanation it is noted that the viewer can select any function to be controlled and can advance or retard the function at will.

It is apparent that the drive can be used in manual tuning systems to replace the friction clutch and cam systems presently in use. In these applications the absence of the frictional clutch will be distinctly advantageous.

It will be understood that modifications and variations may be effected without departing from the scope of the novel concepts of the present invention. Accordingly the invention is not to be considered limited to the specific form or arrangement herein described and shown.

What is claimed is:

1. A two speed transmission for coupling a source of rotational power to a load to be driven comprising a source of rotational power; a first wheel operatively coupled to said source for rotation therewith; a first sector of a wheel pivoted at its wheel center, the position of said first sector being such relative to said first wheel that the peripheral portion of said first sector may enter into driving engagement with said first wheel; a second sector rigidly attached to said first sector and having the same wheel center as said first sector; a second wheel adapted for driving a rotational load, the position of said second wheel relative to the peripheral surface of said second sector being such that the peripheral surface of said second sector may enter into driving engagement with said second wheel; bias means for causing said first sector when not in driving engagement with said first wheel to tend toward engagement with said first wheel; second means for coupling said first wheel in driving engagement with said second wheel, said second means having a dead zone corresponding in arc length to the driving zone of the system comprising said first wheel, said first sector, said second sector, and said second wheel.

2. A transmission as described in claim 1, said second means comprising an annular slot in said second wheel and a pin rigidly attached to said first wheel, said pin positioned relative to said slot so that said pin may move freely in said slot until reaching the ends of said slot at which time said pin enters into driving relation with said second wheel at the said ends of said slot.

3. A transmission as described in claim 1, the lengths of arcs of said first and second sectors being such that the period of driving engagement of said second sector with said second wheel is less than the period of driving engagement of said first sector with said first wheel, the radii of said wheels and the radii of said sectors being such relative to each other that during the period of driving engagement said second wheel rotates at a lesser rate than said first wheel.

4. A transmission as described in claim 1, the lengths of arcs of said first and second sectors being such that the period of driving engagement of said second sector with said second wheel is less than the period of driving engagement of said first sector with said first wheel, the radii of said wheels and the radii of said sectors being such relative to each other that during the period of driving engagement said second wheel rotates at a lesser rate than said first wheel, said means for directly coupling said first wheel in driving engagement with said second wheel comprising an annular slot in said second wheel and a pin rigidly attached to said first wheel, said pin positioned relative to said slot so that said pin may move freely in said slot until reaching the ends of said slot at which time said pin enters into driving relation with said second wheel at the ends of said slot.

5. In a remote control system for television receivers having a multiple channel signal transmitter operable by a viewer, a receiver responsive to signals transmitted by the transmitter, a motor, coupling means operable by the receiver in response to a signal in one of the channels and adapted for coupling the motor to the UHF tuner; a transmission between the coupling means and the UHF tuner, said transmission comprising a source of rotational power; a first wheel operatively coupled to said source for rotation therewith; a first sector of a wheel pivoted at its wheel center, the position of said first sector being such relative to said first wheel that the peripheral portion of said first sector may enter into driving engagement with said first wheel; a second sector rigidly attached to said first sector and having the same wheel center as said first sector; a second wheel adapted for driving a rotational load, the position of said second wheel relative to the peripheral surface of said second sector being such that the peripheral surface of said second sector may enter into driving engagement with said second wheel; bias means for causing said first sector when not in driving engagement with said first wheel to tend toward engagement with said first wheel; second means for coupling said first wheel in driving engagement with said second wheel, said second means having a dead zone corresponding in arc length to the driving zone of the system comprising said first wheel, said first sector, said second sector, and said second wheel.

6. A transmission as described in claim 5, said second means comprising an annular slot in said second wheel and a pin rigidly attached to said first wheel, said pin positioned relative to said slot so that said pin may move freely in said slot until reaching the ends of said slot at which time said pin enters into driving relation with said second wheel at the ends of said slot.

7. A system as described in claim 5, said second means comprising an annular slot in said second wheel and a pin rigidly attached to said first wheel, said pin positioned relative to said slot so that said pin may move freely in said slot until reaching the ends of said slot, at which time said pin enters into driving relation with said second wheel at the ends of said slot; the lengths of arcs of said first and second sectors being such that the period of driving engagement of said second sector with said second wheel is less than the period of driving engagement of said first sector with said first wheel, the radii of said wheels and the radii of said sectors being such relative to each other that during the period of driving engagement said second wheel rotates at a lesser rate than said first wheel.

8. A transmission as described in claim 5, said means for directly coupling said first wheel in driving engagement with said second wheel comprising an annular slot in said second wheel and a pin rigidly attached to said first wheel, said pin positioned relative to said slot so that said pin may move freely in said slot until reaching the ends of said slot at which time said pin enters into driving relation with said second wheel at the ends of said slot.

9. A two-speed transmission, comprising:
a source of power;
a first driving means driven by said source;
a second driving means including a driven member drivingly engageable with said first driving means for a portion of the travel of said first driving means but non-drivingly engaged therewith during a subsequent portion of said travel of said first driving means;

said second driving means also including an intermediate driving member;

a load member to be driven;

the intermediate driving member being operatively drivingly engageable with said load member for a portion of the travel of said intermediate driving member but non-drivingly engaged therewith during a subsequent portion of said travel of said intermediate driving member;

moving means operatively connected to said first driving means and to said load member including a lost-motion connection;

the parts being arranged to provide that initial movement of said first driving means will initially drive said load member through said second driving means, the moving means then slipping as accommodated by said lost-motion connection, subsequent drive of said load member being through said moving means;

the said first driving means and the said load member being rotatable about a common axis; and the lost-motion connection including the provision of an elongated receiver means in said load member arcuately extending circumferentially but non-continuously therein co-axially with said axis, and a driving member operatively held by said first driving means and extending operatively into the said receiver means.

10. A two-speed transmission, comprising:

a source of power;

a first driving means driven by said source;

a second driving means including a driven member drivingly engageable with said first driving means for a portion of the travel of said first driving means but non-drivingly engaged therewith during a subsequent portion of said travel of said first driving means;

said second driving means also including an intermediate driving member;

a load member to be driven;

the intermediate driving member being operatively drivingly engageable with said load member for a portion of the travel of said intermediate driving member but non-drivingly engaged therewith during a subsequent portion of said travel of said intermediate driving member;

moving means operatively connected to said first driving means and to said load member including a lost-motion connection;

the parts being arranged to provide that initial movement of said first driving means will initially drive said load member through said second driving means, the moving means then slipping as accommodated by said lost-motion connection, subsequent drive of said load member being through said moving means;

the second driving means comprising a sector pivotally mounted upon an axis parallel to but spaced from the axes of said first driving means and the said load member; the driven member of the second driving means and the intermediate driving member thereof being provided by face-portions of said sector concentrically disposed with respect to the said axis of the sector.

11. A two-speed transmission, comprising:

a source of power;

a first driving means driven by said source;

a second driving means including a driven member drivingly engageable with said first driving means for a portion of the travel of said first driving means but non-drivingly engaged therewith during a subsequent portion of said travel of said first driving means;

said second driving means also including an intermediate driving member;

a load member to be driven;

the intermediate driving member being operatively drivingly engageable with said load member for a portion of the travel of said intermediate driving member but non-drivingly engaged therewith during a subsequent portion of said travel of said intermediate driving member;

the driving engagement of said intermediate driving member with said load member being for an interval of movement of said second driving means different from the interval of engagement of said driven member of the second driving means with the said first driving means;

moving means operatively connected to said first driving means and to said load member including a lost-motion connection;

the parts being arranged to provide that initial movement of said first driving means will initially drive said load member through said second driving means, the moving means then slipping as accommodated by said lost-motion connection, subsequent drive of said load member being through said moving means;

the interval of driving engagement of said driven member of the second driving means with the first driving means overlapping at both ends the interval of engagement of said intermediate driving member with said load member.

12. A two-speed transmission, comprising:

a source of power;

a first driving means driven by said source of power;

a second driving means including a driven member drivingly engageable with said first driving means for a portion of the travel of said first driving means but non-drivingly engaged therewith during a subsequent portion of said travel of said first driving means;

said second driving means also including an intermediate driving member;

a load member to be driven;

the intermediate driving member being operatively drivingly engageable with said load member for a portion of the travel of said intermediate driving member but non-drivingly engaged therewith during a subsequent portion of said travel of said intermediate driving member;

the driving engagement of said intermediate driving member with said load member being for an interval of movement of said second driving means different from the interval of engagement of said driven member of the second driving means with the said first driving means;

moving means operatively connected to said first driving means and to said load member including a lost-motion connection;

the parts being arranged to provide that initial movement of said first driving means will initially drive said load member through said second driving means, the moving means then slipping as accommodated by said lost-motion connection, subsequent drive of said load member being through said moving means.

13. A two speed transmission, comprising:

a source of power;

a first driving means driven by said source;

a second driving means including a driven member drivingly engageable with said first driving means for a portion of the travel of said first driving means but non-drivingly engaged therewith during a subsequent portion of said travel of said first driving means;

said second driving means also including an intermediate driving member;

a load member to be driven;

the intermediate driving member being operatively drivingly engageable with said load member for a portion of the travel of said intermediate driving member but non-drivingly engaged therewith during a subsequent portion of said travel of said intermediate driving member;

moving means operatively connected to said first driving means and to said load member including a lost-motion connection;

the parts being arranged to provide that initial movement of said first driving means will initially drive said load member through said second driving means, the moving means then slipping as accommodated by said lost-motion connection, subsequent drive of said load member being through said moving means.

References Cited

UNITED STATES PATENTS

| 1,671,996 | 6/1928 | Powell | 74—10.5 |
| 3,090,932 | 5/1963 | Torrence | 74—10.8 |

DONLEY J. STOCKING, *Primary Examiner.*

DAVID J. WILLIAMOWSKY, *Examiner.*

L. H. GERIN, *Assistant Examiner.*